3,226,355
FLAME RESISTANT COMPOSITIONS CONTAINING CHLOROSULFONATED POLYETHYLENE, EPOXY RESIN, AND PHOSPHONITRILIC CHLORIDE

George Singleton and John Alexander Ross, Leyland, England, assignors to BTR Industries Limited, London, England, a British company
No Drawing. Filed Oct. 18, 1961, Ser. No. 146,000
Claims priority, application Great Britain, Oct. 24, 1960, 36,426/60
4 Claims. (Cl. 260—41)

The invention relates to compositions containing elastomeric compounds, and more particularly relates to compositions comprising also phosphonitrilic chloride polymers.

Commercial polymeric phosphonitrilic chloride contains a mixture of phosphontrilic chloride polymers and generally consists of oil and crystals and contains, for example:

|  | Percent |
| --- | --- |
| Linear end-stopped polymers | 20–25 |
| Trimer (cyclic) | 30–35 |
| Tetramer (cyclic) | 10–20 |
| Higher polymers | 30–40 |

It is to be understood that the expression "a phosphonitrilic chloride polymer" includes mixtures of polymers.

This mixture can be polymerised by heating in vacuo in a glass vessel at 250–350° C. for one hour, to give a rubbery polymer which is very similar to under-vulcanised natural rubber. This polymer is stable up to 500° C. but then starts to decompose slowly. It is unstable to moisture and for this reason unsuitable for many applications on its own.

It has now been discovered that useful compositions comprise a mixture of a particular elastomeric compound and a phosphonitrilic chloride polymer. Preferred compositions according to this invention are particularly useful for applications where fire-resistant properties are desired.

According to the invention there are provided novel heat-resistant compositions comprising an elastomeric compound consisting of chlorosulfonated polyethylene in admixture with phosphonitrilic chloride polymers.

The proportions of phosphonitrilic chloride polymer to chlorosulfonated polyethylene may be varied over a wide range, e.g., from 1:1 to 1:10 on a weight basis. However, it will be appreciated that in any particular application the optimum amount of phosphonitrilic chloride polymer can be selected without difficulty after appropriate tests.

Preferably the new compositions contain an inorganic oxide which may react, under suitable conditions, with one or more of the ingredients. Examples of such oxides are magnesium oxide and antimony oxide.

Particularly preferred compositions in accordance with the invention contain a proportion of an epoxy resin, e.g., from 10 to 30 percent by weight of the weight of the chlorosulfonated polyethylene.

The normal rubber additives which may be added to chlorosulfonated polyethylene may be included in compositions according to this invention.

Compositions according to this invention may include plasticisers such as are commonly used in the rubber and thermoplastic arts; also thermoplastic materials such as polyvinyl chloride or plasticised polyvinyl chloride may be included.

Various fillers can be included with advantage in heat resistant compositions based upon the compositions of this invention. Examples of such fillers are asbestos, clays or silica.

Compositions according to the invention may include also a thermoplastic polymer.

The mixing or blending of the compositions of this invention may be effected by milling the various ingredients employing normal rubber machinery; and the forming, shaping or moulding of articles from the new compositions of the invention may be carried out with the kind of machinery used in the rubber fabricating art.

Certain compositions according to the invention particularly those containing chlorosulfonated polyethylene, epoxy resin and phosphonitrilic chloride polymers, may be cured at elevated temperatures in a press. Curing may be carried out in a steam or air atmosphere. It has been found that certain compositions in accordance with the invention have much superior flame-resistant and temperature resistant properties when cured in hot air.

Various preferred compositions in accordance with the invention may be used in applications where flame-resistant and/or resistance to high temperatures is required. Examples of such applications are flame-resistant hose covers, belting, as a binder for glass, asbestos or silica fibers or fabrics.

The invention includes flame resistant or heat resistant articles when made from compositions according to the invention.

Following is a description by way of example of two compositions in accordance with the invention. Parts and percentages in this specification are by weight.

Example 1

| | |
| --- | --- |
| Hypalon 20 (chlorosulfonated polyethylene) | 100.00 |
| A.C. polyethylene | 5.60 |
| P.33 F. T. Black | 39.60 |
| Barytes | 15.10 |
| Epikote 828 (epoxy resin) | 15.10 |
| Rubber oil | 2.50 |
| R.D. 72 extender (high molecular weight cyclic hydrocarbon mixture) | 2.50 |
| Rosin oil | 0.47 |
| M.B.T.S. (di-2-benzothiazyl disulphide) | 1.58 |
| Tetrone A (di-pentamethylene thiuram tetra-sulphide) | 1.58 |
| D.O.T.G. (NN$^1$ di-o-tolylguanidine) | 0.25 |
| $(PNCl_2)n$ | 25.00 |
| Megnesia | 8.50 |

The "Hypalon 20" brand of chlorosulfonated polyethylene is manufactured by E.I. du Pont de Nemours & Company and is described in that company's Elastomers Division Report No. 56–4, dated September 1956, as containing approximately 29% chlorine, with 1 chlorine atom for every 6 carbon atoms, and 1.25% sulfur in the form of 1 sulfonyl chloride group allotted to approximately every 100 carbon atoms. "Epi-Kote" is reported at page 614 of the Modern Plastics Encyclopedia issue for 1961 (published September 1960) as a brand name of epichlorohydrin bisphenol resin which, as reported on page 620 of the same publication, is marketed by Furane Plastics, Inc., of Los Angeles, California.

The composition was press cured at 150° C. and the following experimental results were obtained to illustrate various properties of the composition.

| Cure | Hardness, Shore A2 | Modulus | | | E.B., percent | T.S., p.s.i. |
|---|---|---|---|---|---|---|
| | | 100% | 200% | 300% | | |
| 15' | 63 | 407 | 796 | 1,099 | 355 | 1,195 |
| 30' | 68 | 554 | 1,151 | 1,531 | 300 | 1,545 |
| 60' | 71 | 873 | 1,764 | | 210 | 1,885 |

| Mooney Plasticity at 100° C. | | | | | Mooney Scorch at 120° C. | | |
|---|---|---|---|---|---|---|---|
| 0' | 1' | 2' | 3' | 4' | Initial | Min. | 10° |
| 70 | 50 | 44 | 40 | 38 | 171° | 100½° | 38' |

*Example 2*

Parts by weight

| | |
|---|---|
| Hypalon 40 | 100 |
| Polyethylene | 4.0 |
| Carbon black | 10.0 |
| Calcium carbonate | 45.0 |
| Epoxy resin | 15.0 |
| $(PNCl_2)n$ | 20.0 |
| Magnesia | 10.0 |
| Processing oil | 10.0 |
| Tetrone A | 0.75 |
| Nickel dibutyl dithiocarbamate | 1.0 |
| Di-o-tolylguanidine | 0.5 |
| Geon 101 (polyvinyl chloride) | 6.0 |
| Trixylyl phosphate | 4.0 |
| Basic lead carbonate | 0.36 |
| Di-alphanyl phthalate | 2.0 |

| Cure | Hardness, Shore A2 | Modulus | | | E.B., percent | T.S., p.s.i. |
|---|---|---|---|---|---|---|
| | | 100% | 200% | 300% | | |
| 30 mins | 62 | 622 | 1,356 | 1,710 | 310 | 1,765 |

"Hypalon 40" is the trademark of E.I. du Pont de Nemours & Company for chlorosulfonated polyethylene which, in Report No. 59–2 of June, 1959 by the Elastomers Division of that company, is identified as containing 32.5% to 36.5% of chlorine and 0.85% to 1.15% of sulfur and as being chemically similar to "Hypalon 20."

The above composition was applied as a cover to hose pipe constructed from a ½" bore nitrile rubber tube and reinforced with a braid of steel wire. Such a hose was found to withstand the conditions for flameproof aircraft engine hose as laid down in the British Ministry of supply specification DTD 3954 for 8 to 12 minutes.

Further, when an insulating layer of silica in fibrous batt form, or of glass fibre, was applied over the steel braid and the above composition used as a cover layer, the hose had even better flameproof properties and withstood the flame conditions of DTD 3954 for 90 minutes without failing. The hose further conformed with flameproof hose specifications for road vehicles and naval vessels wherein the hose is filled with hydraulic oil to a pressure of 500 p.s.i., a flame at 1000° C. is applied to the hose for 30 minutes and the pressure is finally raised to 1500 p.s.i.

The invention is not limited to the details of the foregoing examples. For instance a thermoplastic polymer may be included in the compositions.

We claim:
1. An elastomeric heat-resistant composition consisting essentially of chlorosulfonated polyethylene, phosphonitrilic chloride polymer and epoxy resin in which the proportion by weight of the phosphonitrilic chloride polymer to the chlorosulfonated polyethylene is between 1:1 and 1:10 and the proportion by weight of epoxy resin is in the range of 10% to 30% of the weight of the chlorosulfonated polyethylene.

2. An elastomeric heat-resistant composition as defined in claim 1 wherein the epoxy resin is epichlorohydrin bisphenol.

3. An elastomeric heat-resistant composition as defined in claim 1 and further including a heat-resistant filler selected from the group consisting of asbestos, clay and silica.

4. A flame-resistant elastrometric hose cover composition consisting essentially of chlorosulfonated polyethylene, phosphonitrilic chloride polymer and epichlorohydrin bisphenol in which the phosphonitrilic chloride polymer is a mixture consisting essentially of 20 to 25% linear end-stopped polymer, 30 to 35% cyclic trimer, 10 to 20% cyclic tetramer and 30 to 40% higher polymers, the proportion of the phosphonitrilic chloride polymer to the chlorosulfonated polyethylene is between 1:1 and 1:10 on a weight basis, and the proportion by weight of the epichlorohydrin bisphenol to the chlorosulfonated polyethylene is in the range of 10 to 30%.

References Cited by the Examiner
UNITED STATES PATENTS

| 2,854,425 | 9/1958 | Boger et al. | 260—45.5 |
| 2,866,773 | 12/1958 | Redfarn | 260—2 |
| 3,026,294 | 3/1962 | Lieberman | 260—45.5 |
| 3,113,118 | 12/1963 | Canterino et al. | 260—41 |

MORRIS LIEBMAN, *Primary Examiner.*

LEON J. BERCOVITZ, *Examiner.*